US012251857B2

(12) United States Patent
Moore

(10) Patent No.: US 12,251,857 B2
(45) Date of Patent: Mar. 18, 2025

(54) ARCHITECTURAL RESIN PANEL WITH INCORPORATED SCRAP MATERIALS

(71) Applicant: 3form, LLC, Salt Lake City, UT (US)

(72) Inventor: Charles H. Moore, Salt Lake City, UT (US)

(73) Assignee: 3form, LLC, Salt Lake City, UT (US)

( * ) Notice: Subject to any disclaimer, the term of this patent is extended or adjusted under 35 U.S.C. 154(b) by 744 days.

(21) Appl. No.: 17/006,093

(22) Filed: Aug. 28, 2020

(65) Prior Publication Data
US 2021/0245400 A1 Aug. 12, 2021

Related U.S. Application Data

(60) Provisional application No. 62/972,459, filed on Feb. 10, 2020.

(51) Int. Cl.

| | |
|---|---|
| B29B 9/16 | (2006.01) |
| B07C 5/342 | (2006.01) |
| B29C 43/00 | (2006.01) |
| B29C 43/20 | (2006.01) |
| B29C 43/52 | (2006.01) |
| B29K 67/00 | (2006.01) |
| B29K 105/00 | (2006.01) |
| B29K 105/06 | (2006.01) |
| B29K 105/26 | (2006.01) |
| B29L 7/00 | (2006.01) |
| E04C 2/00 | (2006.01) |
| E04C 2/20 | (2006.01) |
| E04C 2/54 | (2006.01) |

(52) U.S. Cl.
CPC ............. *B29B 9/16* (2013.01); *B07C 5/342* (2013.01); *B29C 43/006* (2013.01); *B29C 43/206* (2013.01); *B29C 43/52* (2013.01); *E04C 2/20* (2013.01); *E04C 2/54* (2013.01); *B29B 2009/168* (2013.01); *B29K 2067/003* (2013.01); *B29K 2105/065* (2013.01); *B29K 2105/251* (2013.01); *B29K 2105/26* (2013.01); *B29L 2007/002* (2013.01); *E04C 2002/005* (2013.01)

(58) Field of Classification Search
CPC .............................. E04C 2/20; B29K 2109/26
See application file for complete search history.

(56) References Cited

U.S. PATENT DOCUMENTS

| | | | | |
|---|---|---|---|---|
| 4,045,603 A * | 8/1977 | Smith | ................ | E04C 2/20 428/903.3 |
| 5,035,331 A * | 7/1991 | Paulson | ................ | B07B 4/08 209/133 |
| 5,075,057 A * | 12/1991 | Hoedl | ................ | B29B 17/0026 264/921 |
| 5,324,589 A * | 6/1994 | Willard | ................ | B32B 27/08 428/476.3 |
| 5,601,891 A * | 2/1997 | Herman | ................ | C08J 11/06 206/524.1 |
| 6,277,474 B1 * | 8/2001 | Murschall | ................ | C08K 5/3475 428/480 |
| 6,329,437 B1 * | 12/2001 | Vincent | ................ | B32B 13/12 521/45.5 |
| 6,550,216 B1 * | 4/2003 | Ohanesian | ................ | E04C 2/388 52/537 |
| 11,000,974 B2 * | 5/2021 | Barahona Osorio | ................ | B29C 51/264 |
| 2011/0274915 A1 * | 11/2011 | Roberson | ................ | B32B 27/08 428/327 |
| 2013/0149484 A1 * | 6/2013 | Moore | ................ | B29C 43/18 264/271.1 |
| 2014/0065341 A1 * | 3/2014 | Sutton | ................ | B29C 43/02 156/296 |
| 2014/0209716 A1 * | 7/2014 | Kulesa | ................ | B02C 21/00 241/21 |
| 2014/0272294 A1 * | 9/2014 | Moore | ................ | B44C 1/24 264/293 |
| 2014/0283472 A1 * | 9/2014 | Moore | ................ | E04C 2/26 264/273 |
| 2015/0183264 A1 * | 7/2015 | Moore | ................ | B44C 5/04 264/293 |
| 2016/0017131 A1 * | 1/2016 | Almaadeed | ................ | C08L 23/10 524/449 |
| 2018/0266112 A1 * | 9/2018 | Kelly | ................ | E04C 2/26 |
| 2019/0315019 A1 * | 10/2019 | Barahona Osorio | ................ | B29C 51/264 |
| 2021/0079158 A1 * | 3/2021 | Gu | ................ | C08G 63/88 |
| 2022/0227922 A1 * | 7/2022 | Hwang | ................ | C08G 63/88 |

FOREIGN PATENT DOCUMENTS

GB 2518757 A * 4/2015 ............. B29C 44/02

OTHER PUBLICATIONS

Latko-Duralek et al. (Journal of Polymers and the Environment, 2019, 27, 2600-2606) (Year: 2019).*

* cited by examiner

*Primary Examiner* — Liam J Heincer
(74) *Attorney, Agent, or Firm* — Workman Nydegger

(57) ABSTRACT

An architectural resin panel that incorporates plastic granules fused together to form a panel core. A portion of the plastic granules are contaminant granules that at least partially include a contaminant material, such as a piece of fabric, plastic film, or plant material. The granules used to form the panel core may be sourced from waste plastic material that would otherwise be required to undergo waste processing.

20 Claims, 7 Drawing Sheets

ARCHITECTURAL RESIN PANEL WITH INCORPORATED SCRAP MATERIALS

CROSS-REFERENCE TO RELATED APPLICATIONS

This application claims priority to and the benefit of U.S. Provisional Patent No. 62/972,459, filed Feb. 10, 2020 and titled "ARCHITECTURAL RESIN PANEL WITH INCORPORATED SCRAP MATERIALS", the entirety of which is incorporated herein by this reference.

BACKGROUND OF THE INVENTION

1. The Field of the Invention

The present disclosure relates generally to architectural panels that incorporate scrap materials for structural and/or aesthetic purposes, and methods of manufacturing such architectural panels.

2. Background and Relevant Art

Recent architectural designs have focused on decorative laminate panel products, such as glass or resin products, which can be used as decorative windows, as partitions in offices and homes, and as surfaces for furniture, among other uses. In particular, architectural resin panels are now particularly popular compared with architectural glass panels because architectural resin panels can be manufactured to be more resilient than architectural glass panels, while having a similar appearance. Manufacturers can also typically produce architectural resin panels at a lower cost than decorative glass panels. Further, resin panels allow for on-site fabrication and adjustment, and resin is also about 50% the weight of glass at a comparable thickness, therefore being easier to install and requiring less support structure.

Present resin products generally used for creating architectural resin panels comprise polyvinyl chloride, acrylic, poly(methylmethacrylate) or "PMMA", poly(ethylene-co-cyclohexane 1,4-dimethanol terephthalate) or "PETG", as well as other related polycarbonate materials. Each of the aforementioned resins can serve as an appropriate glass substitute. For example, polycarbonates, PETG, and PMMA are generally initially manufactured in solid sheet form (i.e., extruded or cast). An extruded or cast sheet is generally a solid preformed sheet, such as a solid 4'×8' PETG sheet (alternatively, 3'×5' sheet, 5'×10' sheet, etc.), which ultimately can form a surface of an architectural resin panel when the panel is in final form.

The manufacture of such architectural resin panels, however, involves the generation of scrap material. For example, there may be fabrication waste associated with the initial manufacture of extruded sheets, trim waste associated with subsequent trimming and cutting processes, and the generation of other scrap material as a result of defect detection, material testing, and other processes associated with the manufacturing process. In addition, architectural resin panels, or products that incorporate these panels, that are at the end of their useful life also become scrap (i.e., waste) product.

Scrap materials associated with architectural resin panels, such as those described above, must be handled in some manner. The scrap materials may be stored in the short-term, but must eventually be moved off site or utilized somehow. One option is to route the scrap material to a post-use processing center such as a waste-to-energy plant, incinerator, or recycling center. However, architectural resin panels often include decorative and/or structural materials embedded within or coated on the panel, such as fabrics, plant materials, metal, rocks, plastic films, plastic coatings, and the like. These embedded or coated materials cause the scrap materials to be nonuniform both within a given piece of waste and between separate batches of scrap material. This nonuniformity tends to make post-use processing difficult. For many post-use processing facilities, it is simply not cost effective or technically feasible to accept architectural resin panels for processing.

Another option for handling architectural resin panel waste is to send it to a landfill. If a post-use processing facility cannot be found, sending to the landfill may be the only remaining option. This is not an ideal solution, however, given the many negative effects associated with landfills. The Unites States is also running out of landfill space, and landfilling is generally seen as an unsustainable form of waste management.

Accordingly, there are a number of disadvantages in the art of architectural resin panels that have not been addressed.

BRIEF SUMMARY OF THE INVENTION

Embodiments of the present invention solve one or more problems in the art by incorporating scrap materials into architectural resin panels. In particular, embodiments of the present invention incorporate granules from waste resin panel materials into the structure of new resin panels in order to form architectural resin panels having unique aesthetic features.

At least one embodiment is an architectural resin panel that includes a plurality of plastic granules fused together to form a panel core. At least some of the plastic granules are contaminant granules that include a contaminant material, such as one or more of fabric, plastic film, or plant material. One or more skin layers may be joined to the panel core, and the one or more skin layers may be formed of the same plastic material as the plastic granules.

In at least one embodiment, about 1% to about 12% of the plastic granules are contaminant granules, or about 2% to about 10% of the plastic granules are contaminant granules, or about 3% to about 8% of the plastic granules are contaminant granules, or about 4% to about 6% of the plastic granules are contaminant granules, with the remaining plastic granules being contaminant-free granules. In at least one embodiment, the plastic granules have an average granule size of about ⅛ inch to about ½ inch, or about 3/16 inch to about 7/16 inch, or about ¼ inch to about ⅜ inch. In at least one embodiment, the contaminant-free granules are substantially transparent, and the borders between the fused plastic granules are visible in the finished architectural resin panel.

Another embodiment is directed to a method for manufacturing an architectural resin panel. The method includes the steps of granulating waste plastic material to form an initial set of plastic granules, and sorting the initial set of plastic granules to form a set of reject granules and a set of accept granules. A majority of the reject granules are contaminant granules at least partially comprising a contaminant material. The accept granules comprise mostly contaminant-free granules but also include about 12% or less contaminant granules. The method also includes the step of fusing the accept granules together to form a panel core.

In at least one embodiment, the step of sorting the initial set of plastic granules uses an optical sorter, and the step of fusing the accept granules utilizes a compression molding process. A presorting and/or preprocessing step may be performed prior to granulating the waste plastic material. A dedusting step may be performed following granulating and prior to sorting of the granulated plastic material. The accept granules may be distributed by substantially equal weight among a plurality of cells arranged to form a layup assembly, and may be compacted prior to fusing to form the finished panel.

Additional features and advantages of exemplary embodiments of the invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present disclosure relates to architectural resin panels that incorporate scrap materials. In particular, embodiments of the present invention incorporate granules from waste resin panel materials into the structure of new resin panels in order to form architectural resin panels having unique aesthetic features.

Figure 1A:
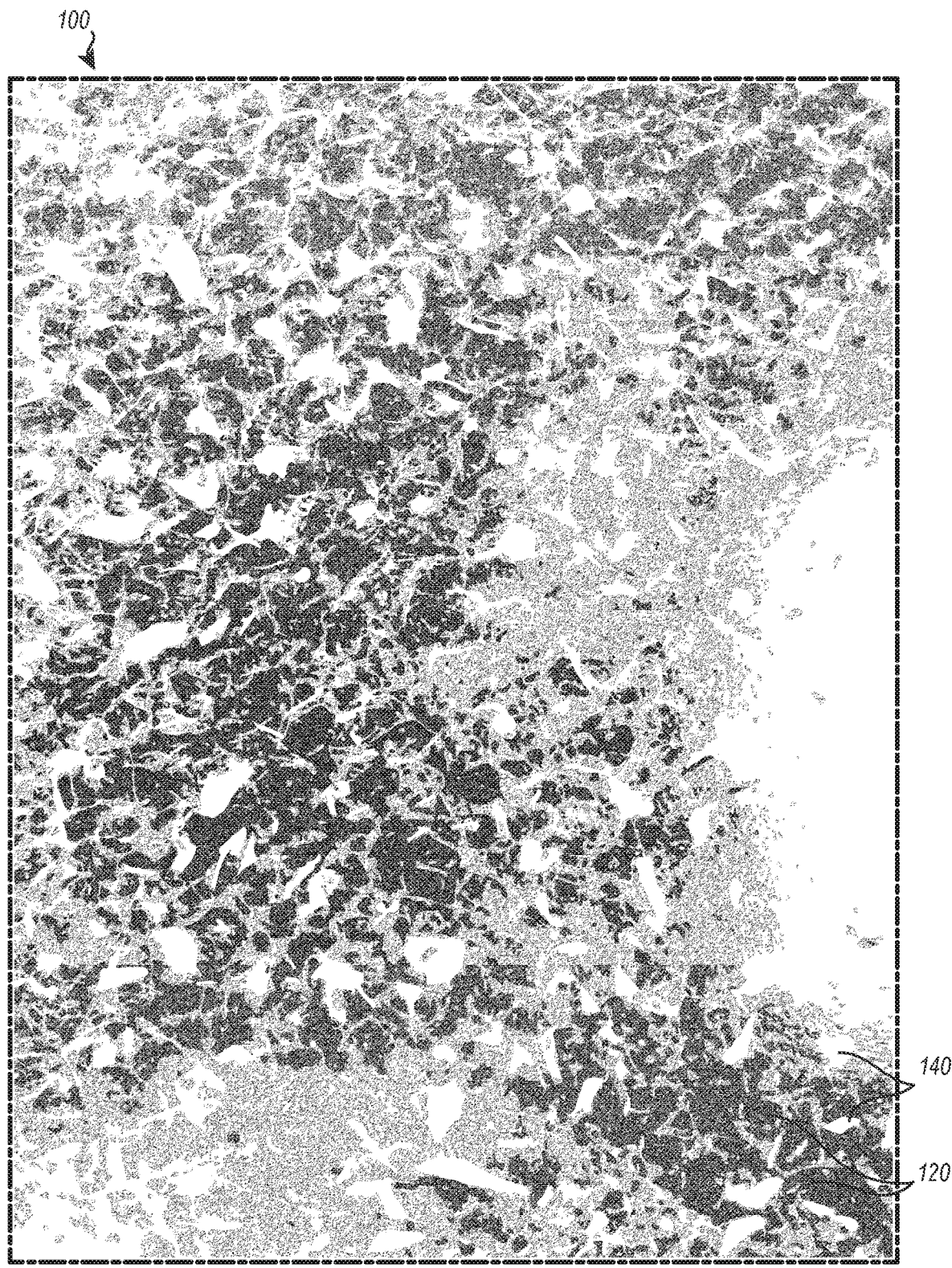
FIG. 1A is a front view of an exemplary architectural resin panel that incorporates waste particles into the structure of the panel.
Figure 1B:
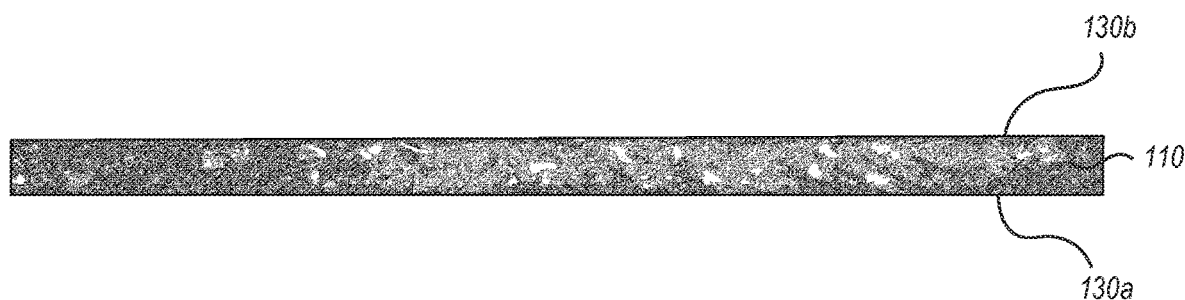
FIG. 1B is a side view of the architectural resin panel of FIG. 1A.

FIGS. 1A and 1B illustrate an exemplary architectural resin panel 100 that at least partially incorporates scrap materials in front and side view, respectively. The architectural resin panel 100 includes a plurality of plastic granules 120 fused together to form a panel core 110. One or more outer "skin" layers 130a and 130b may also be fused together with the panel core 110, as best shown in the side view of FIG. 1B. The skin layers 130a and 130b may be formed from a different material than the plastic granules 120, but preferably are formed from the same plastic material.

The plastic granules may include any plastic material that can be suitably used in a resin panel manufacturing process such as a compression molding process. Examples include polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefin (e.g., UHMW or HDPE or LDPE or PP), thermoplastic polyurethane (TPU), a cellulose-based polymer, polylactic acid (PLA), or polyhydroxyalkanoate (PHA), or combinations thereof.

Preferably, however, the plastic granules 120 are primarily formed from the same material so that effective fusing/bonding of the granules 120 can occur during manufacture and formation of the panel 100. In particularly preferred embodiments, the plastic granules 120 are formed from PETG. Architectural resin panels formed from PETG provide effective structural properties and good aesthetic features.

The borders between the plastic granules 120 of the architectural resin panel 100 may be visible in the finished panel. This provides a more diffuse, textured, and aesthetically pleasing look to the panel 100 as compared to the case where the borders are invisible or significantly less visible. In panels where the granule borders are not visible, the contaminants 140 appear to be "floating" in clear plastic in an aesthetically unpleasing manner. Use of PETG for the plastic granules 120 is particularly associated with the formation of visible granule borders in finished panels.

The plastic granules 120 are preferably substantially transparent, as in the illustrated embodiment. However, as shown, some of the plastic granules 120 are "contaminant granules," which are defined herein as granules at least partially comprising a "contaminant material" 140. Although contaminant materials are usually understood to be undesirable for incorporation into the architectural resin panel 100, intentionally including some controlled amount of contaminant material can result in architectural resin panels 100 that have beneficially aesthetic properties. This also advantageously allows for the reuse of waste plastic materials that would likely otherwise require extensive waste processing or sending to a landfill.

Contaminant materials 140 may include anything that is not formed of the same material as the plastic granules 120, anything that has a different color than the plastic granules 120, and/or anything that has a different opacity than the plastic granules 120. Often, however, the contaminant material is a fabric, a plastic film, or a plant material. The illustrated architectural resin panel 100, for example, includes several pieces of colored, opaque plastic film.

White plastic film, in particular, has been found to provide good aesthetic properties to the architectural resin panel 100, and preferred embodiments having plastic film contaminants include a majority of plastic film contaminants that are white, though one or more other colors may be included as well. For example, some embodiments may include a set of plastic film contaminants where most of the contaminants are white and some minority of contaminants are blue and/or another non-white color.

The proportion of contaminant granules mixed within the plastic granules 120 that make up the panel core 110 can be tuned to maximize the aesthetic properties of the panel 100. If too few or too many of the plastic granules 120 are contaminant granules, the panel 100 will be less aesthetically pleasing. For example, the contaminants may look like they were unintentional if there are too few of them, whereas when too many are included the panel tends to look excessively clustered and overly busy.

The panel 100 may therefore be configured such that about 1% to about 12% of the plastic granules 120 are contaminant granules, or about 2% to about 10% of the plastic granules 120 are contaminant granules, or more preferably about 3% to about 8% of the plastic granules 120 are contaminant granules, or most preferably about 4% to about 6% of the plastic granules 120 are contaminant granules, with the remaining plastic granules 120 being contaminant-free granules. This can translate (e.g., where one or more skin layers 130a, 130b are included) to a weight percentage where the contaminant granules make up about 1% to about 10% of the overall weight of the panel 100, or about 1.5% to about 7.5% of the overall weight of the panel 100, or about 2% to about 5% of the overall weight of the panel 100. Using the foregoing percentages of contaminant granules maximizes the aesthetic look of the resulting panels.

The panel 100 may also be configured to have optical properties that maximize the aesthetic properties of the panel 100. For example, the mixture of contaminant granules and non-contaminant granules may be tailored to produce a panel having a visible light optical transmission of about 50% to about 85%, or about 55% to about 80%, or more preferably about 60% to about 75%.

Panels with a proportion of contaminant granules above the foregoing percentages and/or with optical transmission percentages below the foregoing ranges tended to have an excessively clustered, busy, or "dirty" appearance. On the other hand, panels with a proportion of contaminant granules below the foregoing percentages and/or with optical transmission percentages above these ranges tended to have a boring, insufficiently detailed appearance or to appear as though the sparse contaminant granules were true defects rather than intentional aesthetic features.

Figure 2:
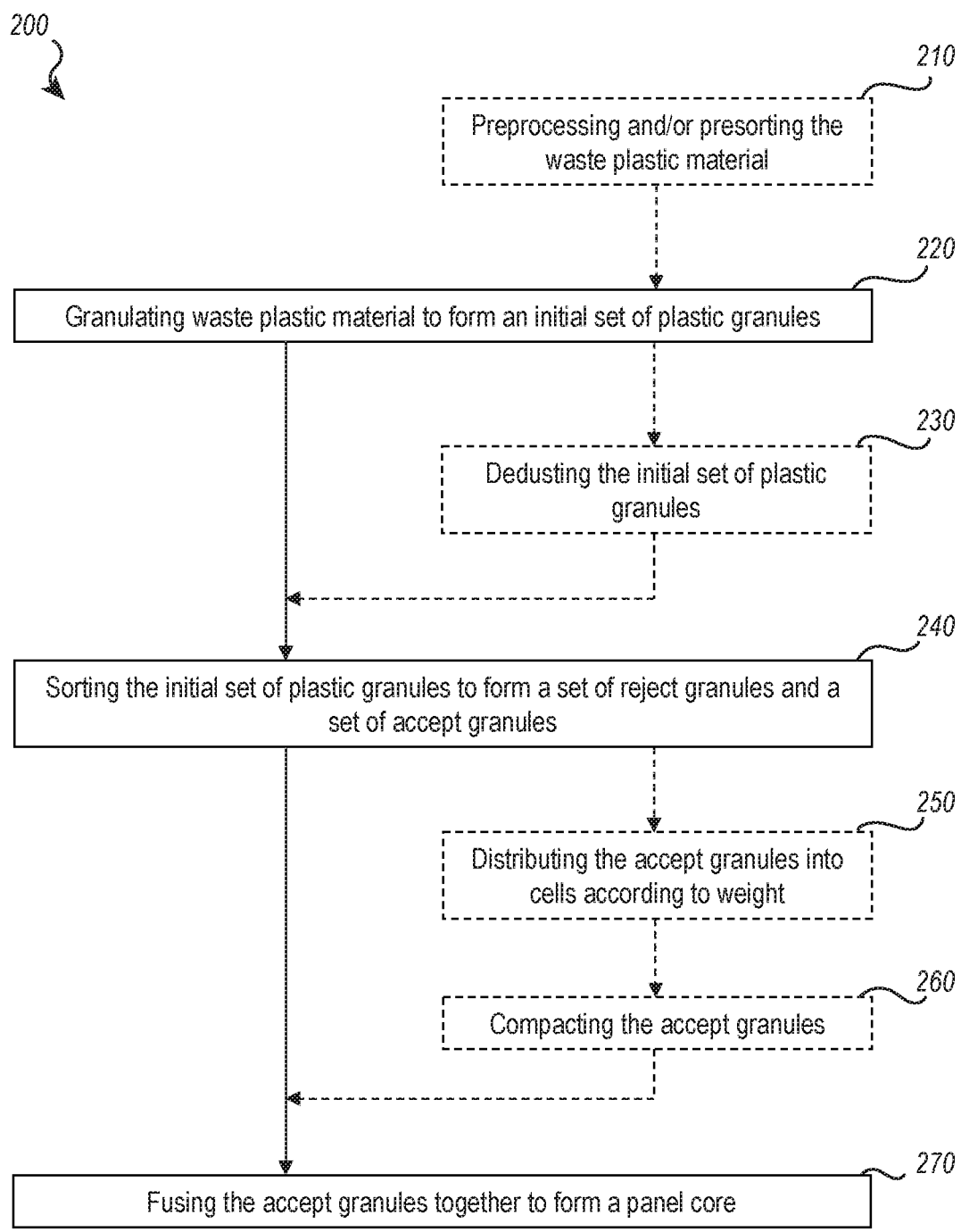
FIG. 2 illustrates a method for manufacturing an architectural resin panel that incorporates waste plastic materials.

FIG. 2 illustrates a method 200 of manufacturing an architectural resin panel such as described herein. In an optional step 210, waste plastic material is preprocessed and/or presorted. A manufacturer may presort the scrap material to remove metal, pieces that include metal, and/or unwanted types of plastic, for example. Preprocessing may include shredding of plastic material to reduce the size of plastic waste pieces to a more manageable size for the subsequent granulating step, for example.

The manufacturer then granulates waste plastic material to form an initial set of plastic granules (step 220). The manufacturer preferably grinds the waste plastic to a particular size range to enhance the effectiveness and/or efficiency of the subsequent sorting step (step 230). If the average granule size is too small, the contaminants become too small and difficult to efficiently sort from the remaining granules. On the other hand, if the average granule size is too large, too many granules will include some amount of contaminant material and will be sorted out, leaving few granules left for subsequent reuse in a new panel. To optimize sorting efficiency, the granulator may grind the waste plastic to an average granule size of about 1/8 inch to about 1/2 inch, or more preferably about 3/16 inch to about 7/16 inch, or most preferably about 1/4 inch to about 3/8 inch.

Following granulating, the manufacturer may optionally clean the initial set of granules by removing all dust and lightweight particles, known as dedusting (step 230). The dedusting step 230 may also be referred to as elutriation or aspiration. The dedusting step may allow the automated sorting process to better distinguish between clear/transparent granules and those that are opaque and/or colored.

The manufacturer may then sort the initial set of plastic granules to form a set of reject granules and a set of accept granules (step 240). This may be accomplished using an optical sorter, as described in more detail below. Most, if not all, of the set of reject granules will be contaminant granules at least partially comprising a contaminant material. Most of the set of accept granules will be contaminant-free granules. However, as mentioned above, the sorting process is configured to intentionally allow a certain amount of contaminant granules within the set of accept granules to provide the resulting panel with a desirable, "flecked" aesthetic property. As explained further below, this sorting step may be repeated in order to achieve a certain amount of contaminant granules within the set of accept granules. With each sorting step the concentration of contaminant granules will decrease.

Following sorting, the manufacturer may fuse the accept granules together to form a panel core (step 270). Optionally, prior to fusing, the manufacturer may distribute the accept granules into multiple cells of a layup according to a substantially equal weight of accept granules in each cell (step 250) and/or may mechanically compact the accept granules (step 260), as explained in more detail below. The manufacturer preferably utilizes compression molding to perform the fusing step.

Figure 3:
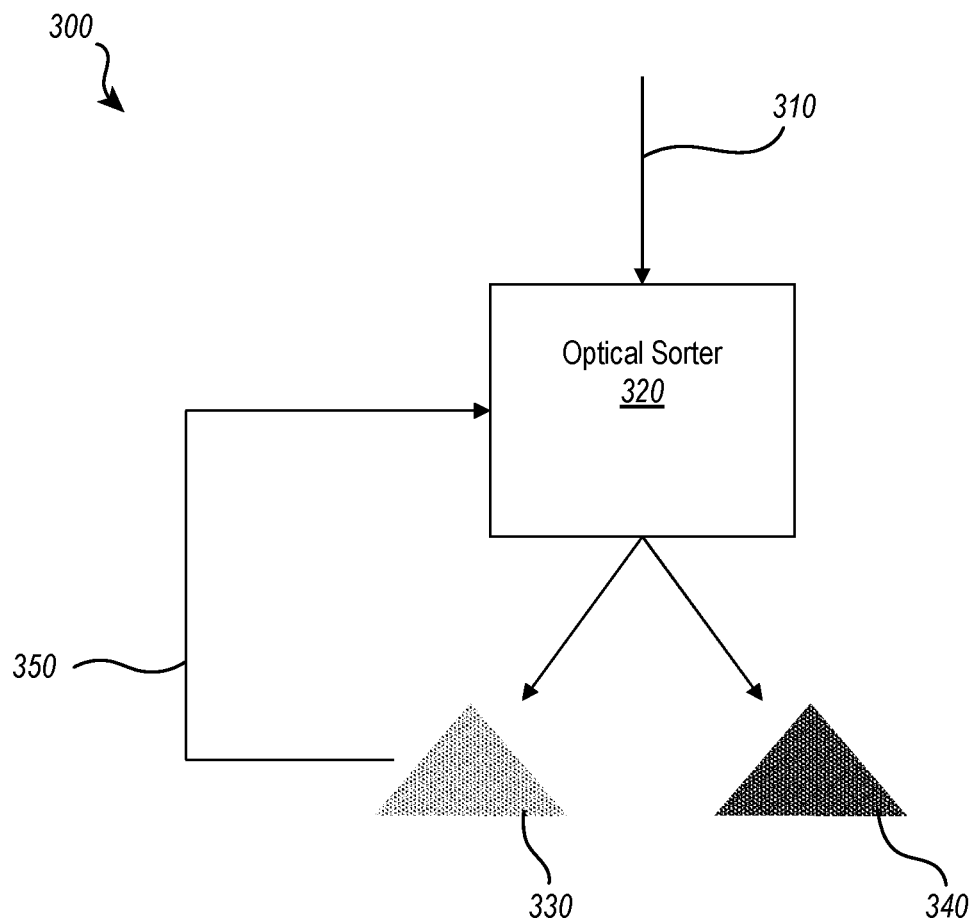
FIG. 3 illustrates an optical sorting process that may be utilized to sort an initial set of waste plastic granules into a set of accept granules and a set of reject granules.

FIG. 3 schematically illustrates an exemplary sorting process 300 that may be utilized in step 240 of the method 200. The process feeds an input stream 310 of the initial set of plastic granules to an optical sorter 320 such as a free-fall optical sorter. The optical sorter 320 sorts the granules according to opacity, color, or some combination thereof. For example, the optical sorter 320 may be configured to allow transparent granules to pass to the set of accept granules 330 while any opaque and/or colored granules are sorted into the set of reject granules 340.

The process 300 may optionally reroute some or all of the set of accept particles 330 back through the optical sorter 320 in a reroute stream 350 to further sort the granules and further remove contaminant granules. Depending on particular optical sorter 310 settings, particular waste plastics utilized, and particular application needs, approximately two to three passes through the optical sorter 320 provides a set of accept granules 330 with a targeted proportion of contaminant granules to contaminant-free granules. Less than about two passes tends to provide a set of accept granules 330 that still retains too many contaminant granules, whereas more than about three passes tends to provide a set of accept granules 330 that is too "clean" and does not include a desired amount of contaminant granules.

Figure 4A:
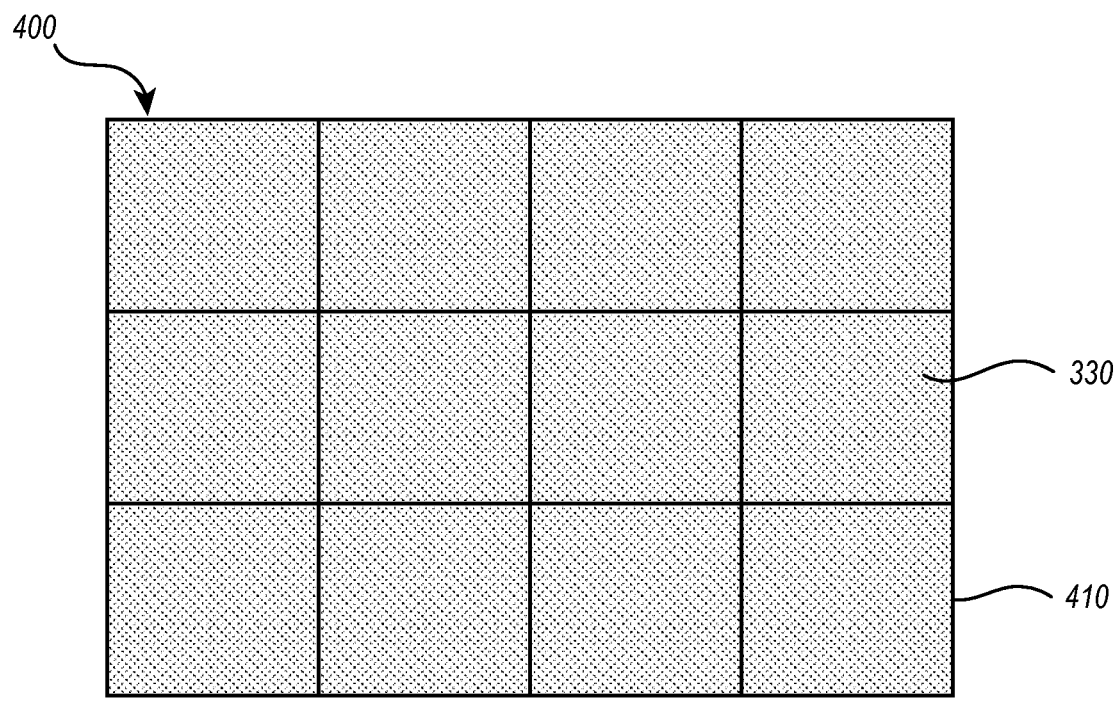
FIG. 4A illustrates a plan view of a layup assembly, and illustrates a process of dividing the layup assembly into substantially equal cells and metering of a substantially equal amount of accept granules into each cell.

FIG. 4A schematically illustrates a layup assembly 400 for manufacturing an architectural resin panel/sheet, and which may be utilized in conjunction with step 250 of method 200. As shown, the manufacturer may place a grid 410 or similar border structure (and/or laser grid or projection systems) that divides the layup assembly 400 into multiple cells, and may place a substantially equal amount (e.g., by weight) of accept granules 330. This arrangement beneficially distributes the accept granules 330 across the desired sheet size in a uniform manner and decreases the introduction of size defects into the process. The grid 410 may be removed prior to subsequent compression molding of the granules 330. The cell size may vary according to particular application needs, but may generally be within the range of about 0.5 to about 4 square feet, more commonly about 1 to 2 square feet.

Figure 4B:
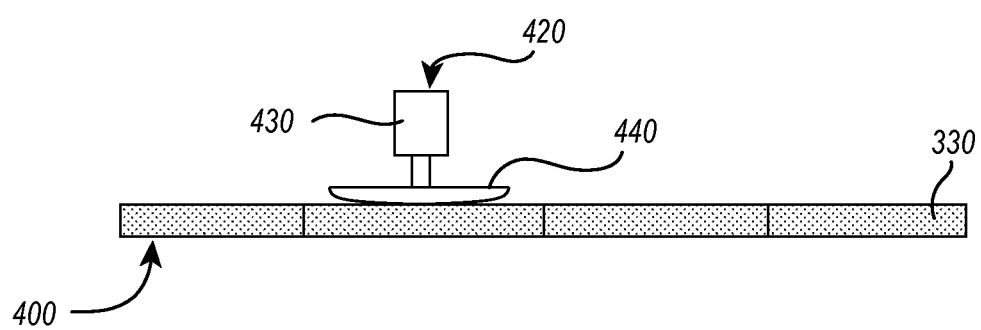
FIG. 4B illustrates a process of compacting the accept granules of the layup assembly prior to fusing the granules together.

FIG. 4B illustrates a process for using a compactor 420 to compact the granules 330 of the layup assembly 400, and which may be used in conjunction with step 260 of method 200. The compactor 420 may include a drive section 430 and a plate section 440. The drive section 430 is configured to apply a compaction force to the plate section 440, which distributes that force and applies it to the accept granules 330. Compaction aids in reducing air gaps between adjacent granules 330, which in turn provides better fusing of granules and better structural integrity of the resulting resin panel.

Figure 6:
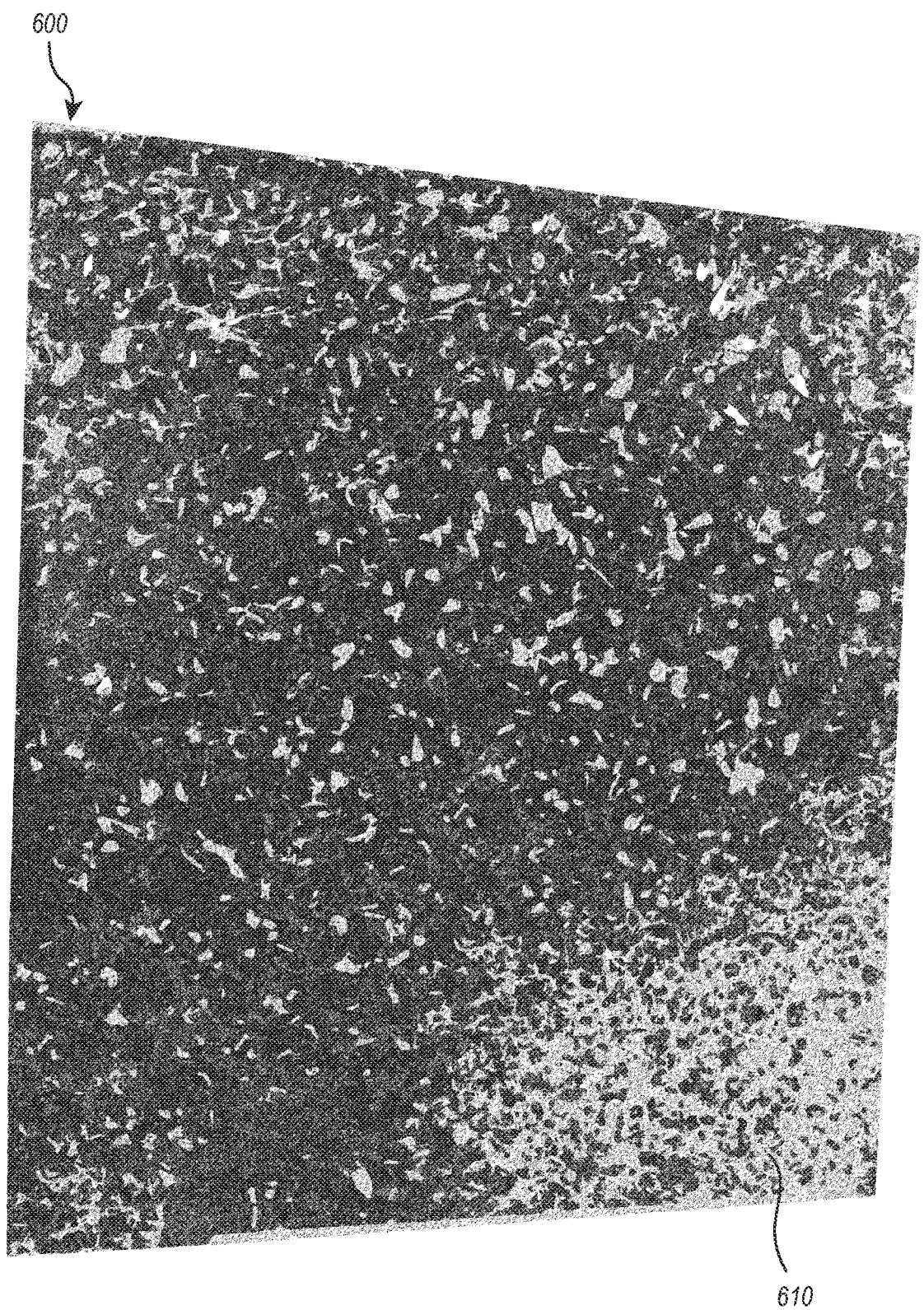
FIG. 6 illustrates an architectural resin panel having a section of air pocket or empty void defects as a result of insufficient compacting prior to compression molding of the granules of the resin panel.

FIG. 6, for example, illustrates an architectural resin panel 600 that includes a section of air pocket or void defects 610 resulting from insufficient compacting prior to fusing of the granules of the resin panel. The air pocket defects 610 can mar the aesthetic features of the panel 600 and/or reduce the structural integrity of the panel 600.

Referring back to FIG. 4B, the drive section 430 is preferably configured to provide vibration, often in a random orbital pattern. The vibration may or may not be have adjustability by the operator. Most often a medium setting works better than a very low or very high setting. The manufacturer may also apply slight downward pressure to the compactor 420, such as about 0.5 to about 5 psi, or about 1 to about 2 psi. This type of compaction provides superior results to vibration treatments applied to the cell or table, which tend to simply cause larger granules to separate from the smaller granules without removing air pockets or increasing the density of the granules.

Figure 5A:
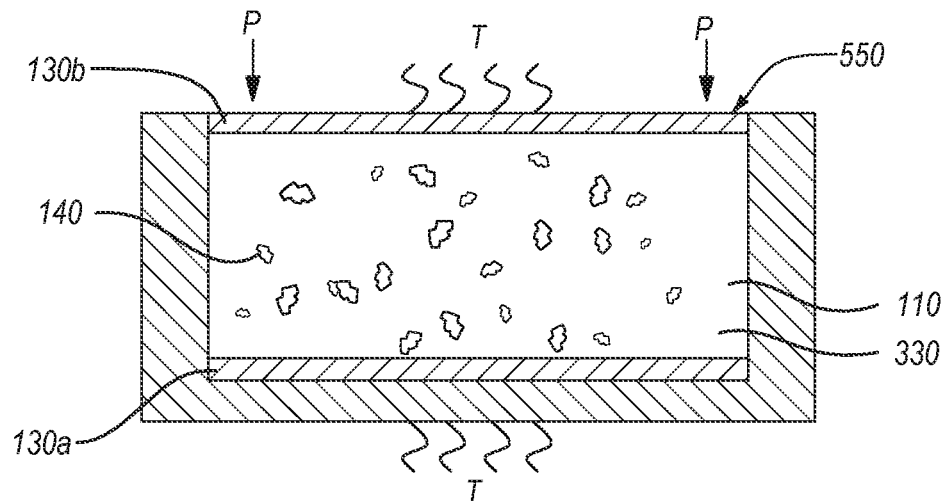
FIG. 5A illustrates an exemplary compression molding process that may be utilized to form an architectural resin panel.
Figure 5B:
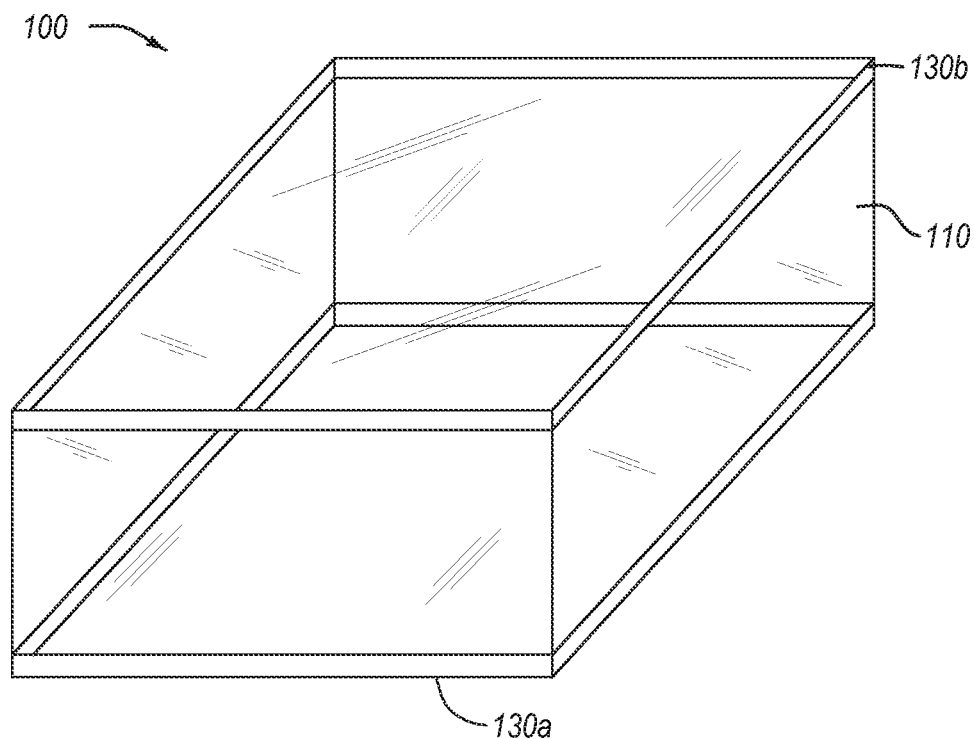
FIG. 5B illustrates an architectural resin panel formed via the compression molding process shown in FIG. 3A.

FIGS. 5A and 5B schematically illustrate a compression molding process that may be utilized in conjunction with step 270 to fuse the assembled accept granules 330 into a finished panel 100. As shown, the accept granules 330 intentionally include a targeted amount of contaminant material 140. The layup assembly 550 may include skin layers 130a and 130b positioned on upper and lower sides of the bed of accept granules 330 that will form the panel core 110. Heat and pressure are applied to the layup assembly 550 to melt and fuse the accept granules 330 to form the panel core 110, and to fuse the panel core 110 to the skin layers 130a and 130b. After fusing together the separate plastic components of the layup assembly 550, the process forms the architectural resin panel 100 as shown in FIG. 5B.

The compression molding process may utilize a pressure of about 60 psi to about 175 psi, and a temperature of about 225° F. to about 380° F. The compression molding process may comprise using a heated mechanical press, autoclave, or other thermosetting environment. Heated mechanical press for performing various acts of the methods described herein include but are not limited to hot steam, electric heat, hot oil heated, and other press types. In light of this disclosure, one will appreciate that the temperatures and pressures for laminating with a heated mechanical press, autoclave, or other thermosetting environment may depend on the material type of the plastic granules, desired sheet/panel size, and other particular application needs.

Architectural resin panels described herein may also include different color features. The color features may be provided by a colored film coating applied to the outer surface of the panel or attached to or integrated into a skin layer, for example. Color features may additionally or alternatively be provided by dyes or direct coloration of the plastic material that forms skin layers and/or the granules of the panel core.

The foregoing embodiments provide architectural resin panels, and methods of manufacturing the same, that can incorporate waste plastic materials in a way that can reduce waste processing burden and that can provide a structurally sound and aesthetically pleasing resin panel.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. An architectural resin panel, comprising:
a plurality of plastic granules fused together to form a translucent panel core having visible borders apparent between the fused plastic granules;
wherein the plurality of plastic granules includes translucent contaminant-free granules, and contaminant granules fused to the contaminant-free granules, wherein the contaminant granules are visible between the contaminant-free granules;
wherein about 3% to about 8% of the plastic granules are contaminant granules, the contaminant granules at least partially comprise a contaminant material, and the contaminant-free granules omit the contaminant material;
wherein the contaminant granules are distributed throughout the architectural resin panel, the architectural resin panel is translucent, and the contaminate granules are visible through the panel, thereby creating a flecked aesthetic property in the architectural resin panel wherein the plurality of plastic granules comprise one or more of polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), polymethyl methacrylate (PMMA), polyolefin (UHMW or HDPE or LDPE or PP), thermoplastic polyurethane (TPU), a cellulose-based polymer, polylactic acid (PLA), or polyhydroxyalkanoate (PHA).

2. The architectural resin panel of claim 1, wherein the contaminant material comprises one or more of fabric, or plant material.

3. The architectural resin panel of claim 1, wherein the contaminant material comprises opaque plastic film, and wherein a majority of contaminant granules including an opaque plastic film include white plastic film.

4. The architectural resin panel of claim 1, wherein the plastic granules comprise ground waste plastic selected to have an average granule size of about ⅛ inch to about ½ inch.

5. The architectural resin panel of claim 1, wherein about 4% to about 6% of the plastic granules are contaminant granules, the remaining plastic granules being contaminant-free granules.

6. The architectural resin panel of claim 1, further comprising one or more skin layers fused to the panel core.

7. The architectural resin panel of claim 6, wherein the one or more skin layers are formed from the same plastic material as the plurality of plastic granules.

8. The architectural resin panel of claim 1, wherein the contaminant granules make up about 3% to about 8% of the overall weight of the panel.

9. The architectural resin panel of claim 1, wherein contaminant-free granules are substantially transparent.

10. The architectural resin panel of claim 9, wherein borders between the fused plastic granules are visible.

11. The architectural resin panel of claim 1, wherein the panel has an optical transmission to visible light of about 50% to about 85%.

12. The architectural resin panel as recited in claim 1, wherein:
a border is visible between the contaminant granules and the contaminant-free granules.

13. A translucent architectural resin panel, comprising:
a plurality of plastic granules fused together to form a panel core;
wherein:
the plurality of plastic granules includes:
substantially transparent contaminant-free granules fused together such that a border is visible between at least some of the transparent contaminant-free granules that are fused together, and
contaminant granules comprising no less than about 1% to no more than about 12% of the plastic granules,
the contaminant granules are fused to the contaminant-free granules, such that the contaminant granules are visible between the contaminant-free granules; and
the architectural resin panel is substantially devoid of visible air pockets or void defects.

14. The translucent architectural resin panel as recited in claim 13, wherein:
the contaminant granules comprise about 3% to about 8% of the plastic granules, and
the contaminant-free granules omit the contaminant material.

15. The translucent architectural resin panel as recited in claim 13, wherein:
the contaminant granules are distributed throughout the architectural resin panel,
the contaminant granules have a size of about ⅛" to about ½".

16. The translucent architectural resin panel as recited in claim 13, wherein:
the architectural resin panel has a visible light optical transmission of about 50% to about 85%.

17. The translucent architectural resin panel of claim 13, wherein the contaminate granules are dedusted.

18. The translucent architectural resin panel of claim 13, wherein the panel has an optical transmission of visible light of about 60% to about 75%.

19. The translucent architectural resin panel of claim 13, further comprising:
one or more skin layers formed of the same plastic material as the plurality of plastic granules;
wherein the one or more skin layers are joined to the panel core.

20. The translucent architectural resin panel of claim 13, wherein:
the contaminate granules provide a fleck aesthetic property to the panel core.

\* \* \* \* \*